Figure 1:
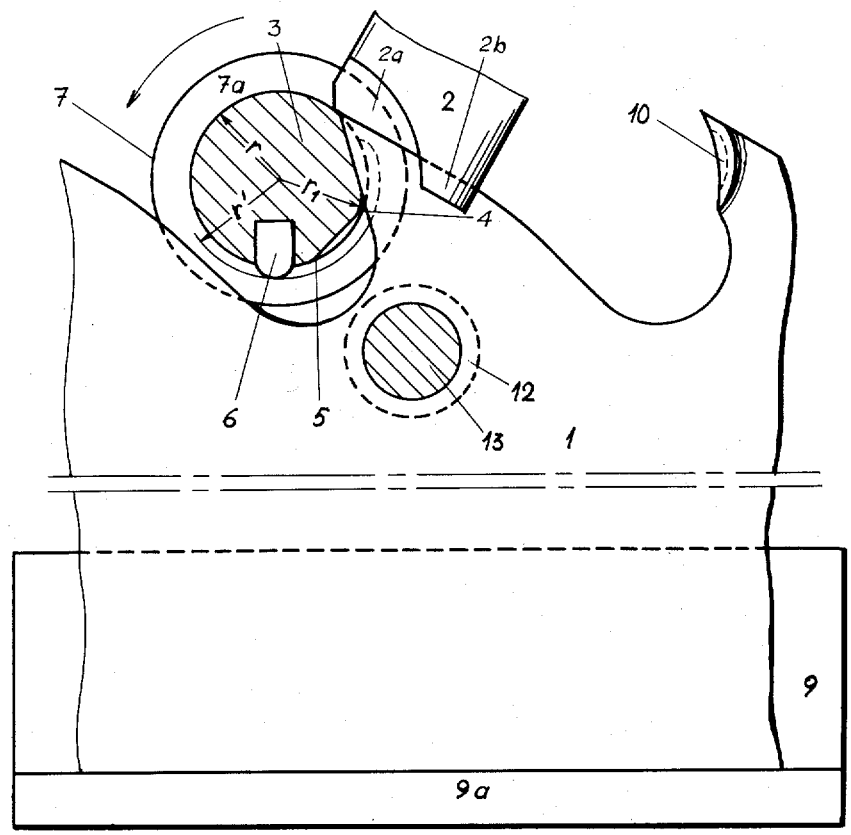

May 23, 1961  E. M. KIVIMAA  2,985,039
METHOD FOR SWAGING TEETH OF SAW BLADES, SWAGING
MACHINE AND SAW BLADE

Filed March 31, 1958  5 Sheets-Sheet 2

Eero M. KIVIMAA
INVENTOR

By: Wenderoth, Lind & Ponack
Attys

May 23, 1961  E. M. KIVIMAA  2,985,039
METHOD FOR SWAGING TEETH OF SAW BLADES, SWAGING
MACHINE AND SAW BLADE
Filed March 31, 1958   5 Sheets-Sheet 3

Eero M. KIVIMAA
INVENTOR

By
Wenderoth, Lind & Ponack
Attys

United States Patent Office 2,985,039
Patented May 23, 1961

2,985,039

METHOD FOR SWAGING TEETH OF SAW BLADES, SWAGING MACHINE AND SAW BLADE

Eero Mikael Kivimaa, Linnankoskenkatu 15A, Helsinki, Finland

Filed Mar. 31, 1958, Ser. No. 725,076

4 Claims. (Cl. 76—54)

The present invention relates to a method for swaging teeth of saw blades, a device for carrying out said method and to a saw blade according to this method.

Compared with the operation of springsetting the teeth, swaging has many advantages, which are well known and recognized. On the other hand the imperfections comprised in the method and earlier proposed devices have limited its use. The known method of swaging has hitherto been carried out in two different operations, i.e. the swaging itself and the subsequent shaping of the tooth sides by pressing or grinding. The success of swaging by said method makes considerable demands on the toughness of the blade material and re-swaging is often necessary. Known swaging devices are inconvenient, generally driven by hand and the clamp screws which press against the blade on both sides stretch it, and often damage it in other ways as well.

The present invention aims to mitigate all the above disadvantages in that according to the invention the swaging is carried out in one single operation, which thus affords a swaging with a predetermined form and dimensions.

The invention consists of a method of swaging saw teeth in which the tooth is swaged to its final, determined form in one operation, wherein the plastic deformation of the tooth is caused by means of a working tool to be moved and pressed against the tooth face and determining by means of limit stops on the tool simultaneously the width of the swage, and supporting the tooth back by an anvil having a tongue fitting between the limit stops. The swaging of the tooth is performed furthermore gradually, but in the same operation so that the working tool has several working points, which during the working of the tool one after another are brought to act upon the work piece. The fastening of the blade is of such a nature that the swaging motion can also be done successively several times.

The device adapted for the performing of the method set forth above thus comprises a tool which is constituted by a rotatable eccentric or eccentric die fitted with limit stops which determine the width of the swage. Between these stops are formed working points, which lie at different distances from the geometric axes of the die. One or a few of the working points may appear as knobs projecting from the surface of the eccentric die. The machine intended for the realization of the invention further comprises necessary elements for the semi-automatic or automatic function of it, e.g. a suitable source of energy, such as a transmission arrangement driven by an electric motor, by the aid of which the blade is transferred to and from the working position and by which the blade back is given support during the working motion of the die.

Figure 8:
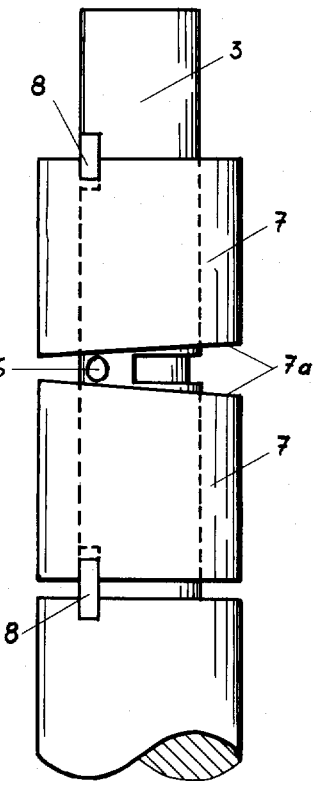
Figure 9:
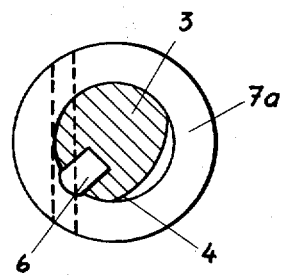
Figure 10:
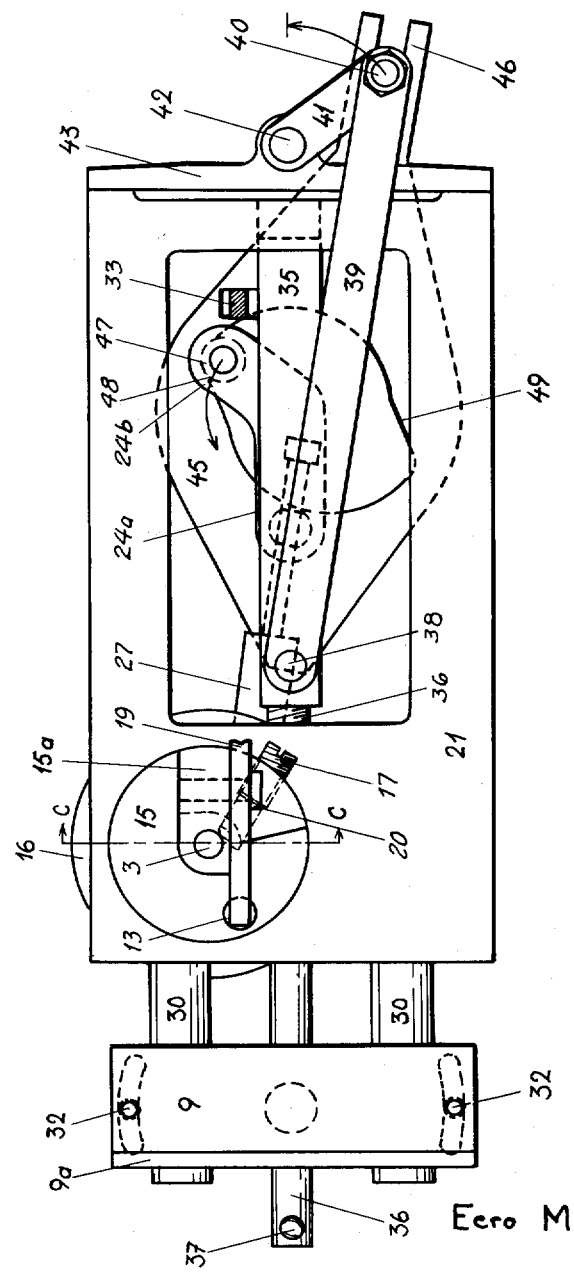
Figure 11:
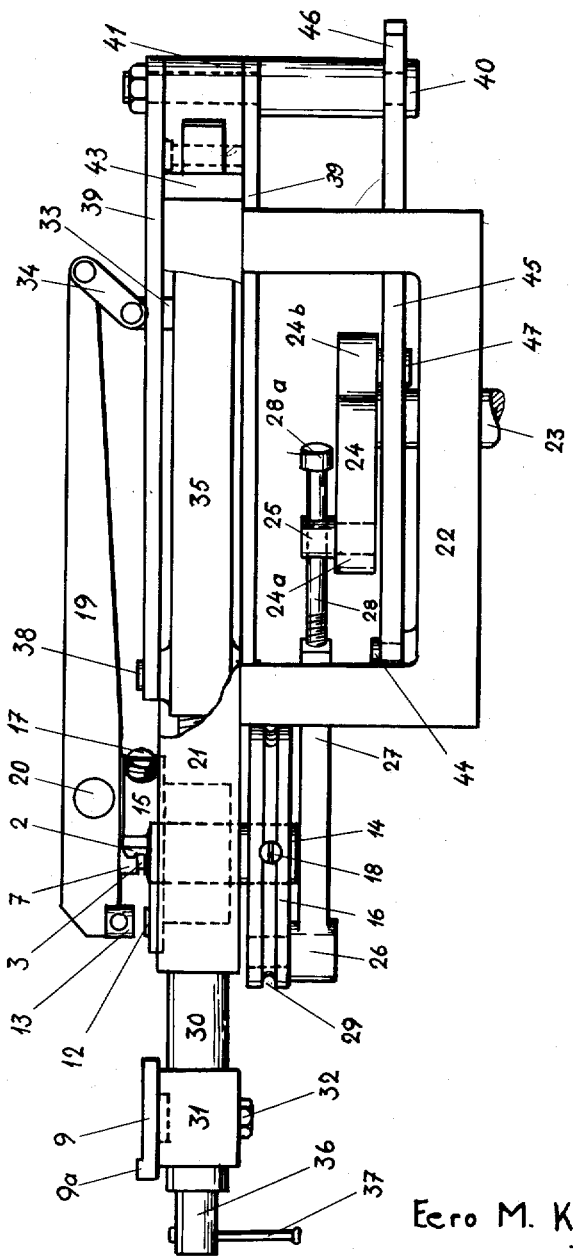
Figure 12:
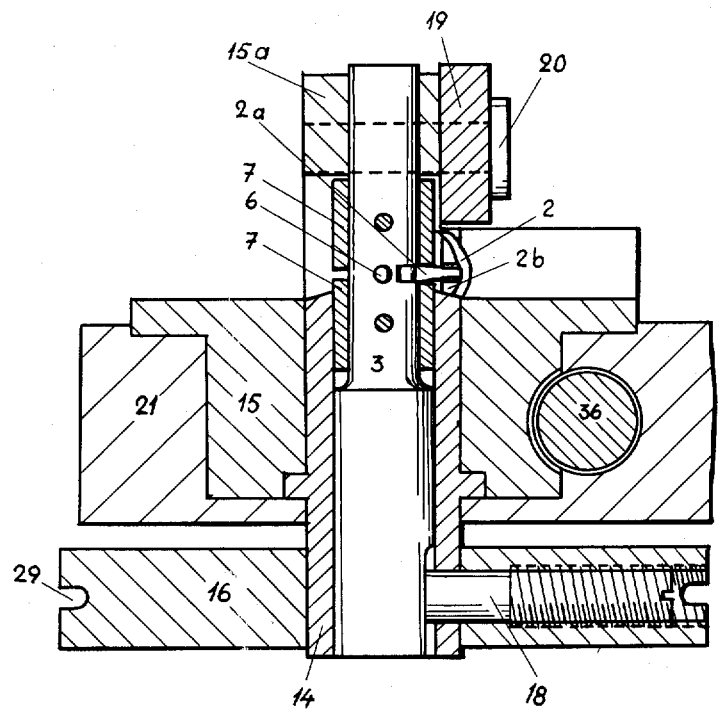

The principle of the invention will appear in the accompanying drawings, in which Figures 1 to 9 illustrate the new method and Figures 10 to 12 the new machine.

Figure 2:
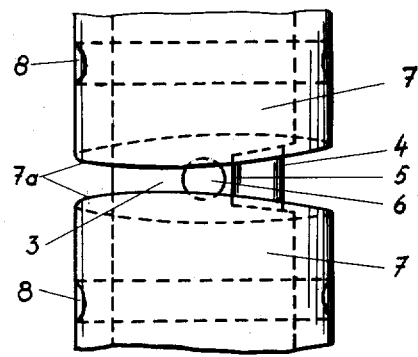
Figure 3:
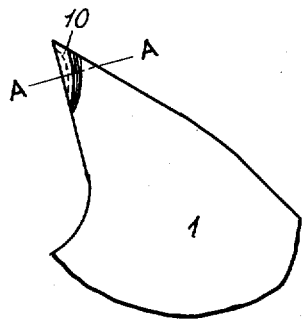
Figure 4:
Figure 5:
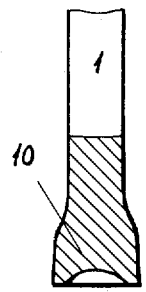
Figures 6, 7:
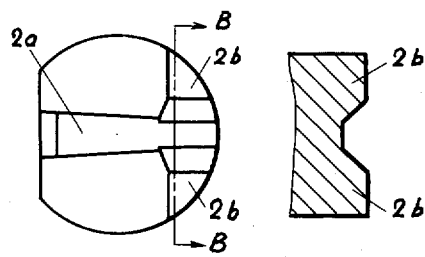

In the drawings:

Figure 1, where the die is shown in section, illustrates the principle of the method according to this invention, Figure 2 shows the new die as a side elevation, Figure 3 shows a swaged and sharpened tooth in side elevation, Figure 4 from the front of the tooth, Figure 5 is an enlarged section of the tooth along the line A—A in Figure 3, Figure 6 shows an anvil from the tooth side, Figure 7 is a section along the line B—B in Figure 6, Figure 8 shows another embodiment of the eccentric die according to the invention in side elevation, Figure 9 is a section along the middle line of the working portion of the eccentric die in Figure 8, Figure 10 shows a machine according to the invention in plan, Figure 11 the same machine in a side elevation, and Figure 12 shows a section along the line C—C in Figure 10.

In the drawings 1 shows the saw blade, 2 the anvil, 3 the eccentric die, 4 the first working point of the eccentric, 5 the second and 6 the third working point, which is like a knob and in this case the head of pin which is driven in the die, 7 shows the limit stops or side-limiting elements, which are secured by split pins 8 on the die 3 and 7a the actual working surfaces of the stops. 10 shows the actual widened cutting part of the tooth generated by swaging and 11 is the impression of the working pin 6. The anvil 2 has a tongue 2a which fits in-between the surfaces 7a of the limit stops 7, and a guiding slot with guiding edges 2b.

The function of the swaging parts will best appear from Figure 1, where the swaging eccentric 3 is seen in its initial position and the back of the tooth to be worked is pressed against the anvil 2 and the face of the tooth against the die 3. When the die is turned counterclockwise as shown by the arrow, the working point 4 the radius $r_1$ of which is smaller than the radius $r$ of the eccentric axle, penetrates into the face of the tooth and causes the widening of it. On further rotation the point 5 carries out a further forming action while the surfaces 7a of the stops support the cutting part of the tooth to be formed from the side and prevent undesirable widening of the tooth. Thereafter, in the third stage the working knob 6, the radius $r'$ of which is greater than $r$, penetrates into the face of the tooth and the forming results in a deep swaging when the tooth is well supported between the tongue 2a of the anvil, the die 3 and the limit stop surfaces 7a. The blade is then released from its fastening and the cutting part of it looks as shown in the right hand portion of Figure 1 and as in Figures 3 to 5 after the first sharpening operation. During the treatment the tooth remains undamaged and the formation of wide side surfaces allows several sharpenings without reswaging. The impression 11 of the working knob 6 does not itself make the use of the tooth more difficult and disappears later at re-sharpenings. The very accurate centering of the tooth between the limit stops assures the forming of an exact symmetric swaging and is caused by means of the guiding edges 2b of the anvil (Figures 1, 6 and 7). Due to the slight variation of the gauge of the blade the edges 2b are beveled and the width of the bottom of the slot is chosen so as to be the same or slightly smaller than the minimum gauge of the blade. Thus in this way the blade is centralized automatically. The tongue 2a of the anvil is wider and so dimensioned, that it fits well in between the surfaces 7a of the stops when the eccentric is turned to its final position. The tongue of the anvil can also be fitted with low guiding edges for completing or replacing of the guiding edges 2b.

The pressing of the blade against the swaging parts takes place by means of a reciprocating blade bearer 9, having a projecting face 9a against which the back of the blade rests. Depending on the tooth angles the blade bearer may be adjusted in different positions. When it is a question of treating of circular saws, an adjustable support is used which guides and pushes the blade from its centre. To the parts moving the blade bearer a spring system can be connected which presses the blade with a determined and adjustable thrust against the swaging parts. Such a system compensates the occasional minor variations in the width of the blade. Further, by means of the spring system the depth of the swaging can be easily adjusted. The parts guiding the blade further comprise a lower guiding support 12 and in corresponding position over the blade the upper guiding support 13 (Figure 1). These supports guide the tooth to the swaging parts, prevent bending or buckling of blade and thus complete the effect of the centralizing guides 2b of the anvil. The distance between the guiding supports is adjusted so that the blade can slide suitably between them. One of the guiding supports can be made to be opened and during the working to be closed tight against the blade in which case the supports can participate in the fastening of the blade.

The space between surfaces 7a of the stops determines the width of the cutting part 10, and the surfaces can lie normal or slightly diagonal to the eccentric 3, as shown in Figure 2, in which case the cutting part of the tooth is given the desired clearance both backwards and downwards to the gullet of the tooth. It is not necessary to consider the surfaces 7a of the stops to be geometric planes only and there can also be more or less than these three working points shown by Figure 1 on the eccentric. Of special importance is, however, the division of the operation into a number of steps and further, that at least one of the working points is like a knob because the swaging of materials which are difficult to work succeeds well by means of such a gradual treatment the tooth being protected by limit stops.

Figures 8 and 9 show another example of the tool according to the invention. The first working step 4 is made e.g. by normal eccentric grinding operation and thus corresponds to steps 4 and 5 in Figure 1 and knob 6 functions again as the second step. The fastening of the side-limiting elements 7 to the eccentric is arranged in a way shown by the figures so that by changing the width of the fastening splints 8 the width of the swaging can be easily adjusted.

Such a small adjustment of the swaging width is based on the fact that the distance of the limit stops at working point 4 on the eccentric can be slightly greater than the width of the said recess in the die 3.

Even if the limit stops in principle can be made of the same piece as the eccentric or fixed firmly to it, the possibility of adjusting them has proved very appropriate in practice.

In summary it can be stated that the novel method is characterized by the following features and their combinations: the limit stops on the eccentric die, the adjustment of the distance between the limit stops, the progressiveness of the working points, the working point resembling a knob, the tongue of the anvil which fits in between the stops, the beveled self-centralizing guiding edges of the anvil, the guiding supports of the blade, the fastening of the blade from its back or from the centre and the spring system of the clamping parts.

Though the many advantages of the novel method in comparison with the old one have proved obvious from the previously explained, there might still be reason to state that the shaping operation has been entirely eliminated by means of this.

Swaging devices themselves for carrying out the method set forth above can naturally be constructed by various means. Figures 10, 11 and 12 illustrate a machine developed to carry out this method.

The eccentric die 3 described previously in detail is secured into a hollow axle 14 in a way that allows easy changing. Axle 14 is rotatable in the actual swaging head 15 of the machine and on the lower end of said axle a swinging wheel or disc 16 is secured. This wheel has the clamping screw 18 of the eccentric. The anvil 2 lies in a bore of the head 15 and its exact distance is adjusted by the screw 17. The head 15 has further a projecting part 15a the bore of which functions as a supporting bearing to the upper end of eccentric 3. The head has still the lower guiding support 12 for the blade and on the projecting part 15a in corresponding position the upper guiding support 13 fixed on clamping lever 19, which by bolt 20 is mounted on the projecting part 15a of head 15. When the blade is placed in between the guides and the tooth is pressed against the eccentric 3 and anvil 2, the swaging itself takes place in the beforementioned way by turning the eccentric 3 by the aid of the swinging wheel 16. The other parts of the machine, shown in figures, are parts, by means of which the said working motion and the fastening or clamping of the blade are mechanized.

The frame of the machine is made e.g. of cast iron and consists of two parts 21 and 22, in the upper part 21 of which the actual swaging head 15 is mounted. The main shaft 23 of the machine rotates in the lower end 22 of the frame which thus also functions as its bearing.

On the main shaft is secured a two arm crank 24 and on one branch 24a there is mounted a crank pivot 25. An extension 28 of a connecting rod 27 slides through the upper end of the crank pivot 25. The connecting rod 27 is secured on a pivot 26 mounted in the swinging wheel 16. When the main shaft 23 rotates and the crank pivot 25 slides against the stop 28a of the extension 28 the eccentric 3 carries out the beforementioned working motion, which ends when crank pivot 25 has reached the dead centre. For adjusting of the final position of the working motion the extension 28 is threadedly connected to the connecting rod 27. An appropriate part e.g. wire rope-spring-combination to be secured to the slot 29 of the swinging wheel 16 returns the eccentric to its adjustable initial position. These parts are not shown in the figures.

For pressing the blade against the swaging parts there is a blade carriage 31 which reciprocates along guides 30 mounted on the upper part 21 of the frame. On the carriage there is pivotally mounted the beforementioned blade bearer 9 secured by bolts 32 and having a projecting face 9a against which the back of the blade rests. Depending on the angles of the tooth the position of the bearer 9 is to be adjusted. If it is question of treating of circular saws, the bearer 9 will be replaced by such an adjustable part which supports and pushes the blade from the centre and if needed from one or more of the teeth.

For moving the carriage there is in the machine a slide 35 to which the carriage 31 is connected by a tension screw 36 passing through the front part of the frame 21. The right distance for each blade is adjusted by screwing the tension screw by the aid of a lever 37. Two connecting rods 39 are further pivoted on the slide 35 by bolts 38. The other ends of the connecting rods are mounted on a crank 41 by means of a bolt 40. When turning the crank 41 to the dead centre shown by the arrow the slide 35 together with the carriage 31 slides from the initial or open position shown in the figures to the final or closed position. The other end of the crank 41 is pivoted by means of bolt 42 on a rigid spring 43 fixed on the frame 21. The spring makes it possible to adjust the force by which the carriage presses the tooth against the swaging parts and at the same time it compensates for the occasional minor variations in the width of the blade.

On slide 35 there is further fixed a column 33, which is connected to clamping lever 19 by lever 34. Thus, when the moving parts are sliding to the closed position, the upper guiding support 13 will also be pressed tight against the blade.

For the turning of the crank 41 there is a sliding plate or program disc 45 pivoted by bolt 44 on the lower part 22 of the frame. Plate 44 has a gap 46 at its other end in which the lower end of bolt 40 slides. The plate 45 gets its motion by means of a roller 47 which is fixed on the other end 24b on the lower side of the crank 24. The roller 47 moves within a cam slot of special form. When the roller during the rotation of the main shaft 23 reaches the position shown in Figure 10, it meets an inwards projecting part or step 48 of the cam slot and forces the plate 45 to turn at which time all the moving parts of the combination slide-carriage are driven to the closed position. When later the roller 47 meets another projecting part or step 49 of the cam slot the moving parts are returned to the open position. When in the closed position the eccentric performs its working motion and is now allowed to return to its initial or open position. The change of the tooth takes place when all the parts are in the initial or open position. The machine can be stopped hereto by the aid of a limit switch after every succession of motions, or it can rotate continually with such a velocity that the workman has enough of time to change the tooth during the open position. It is naturally possible to add feeding parts to the machine by means of which the tooth is mechanically changed and in its way to make the function of the machine automatic.

As regards the details the machine can be modified in many different ways. E.g. connecting rod 27, 28 can be replaced by a wire rope or chain which is fixed on the rim of the swinging wheel 16. Further it is possible to secure the guides 30 to the carriage itself and to allow them to glide in the frame 21.

The principal features of the machine are as follows. The clamping and guiding of the blade by means of a carriage, which supports the blade from its back or from its centre and in addition when needed from one or more of the teeth, the slide system with the spring for moving the carriage, the performing of the working motion of the eccentric by the aid of the connecting rod or wire rope, the synchronization of the motions by means of the same main shaft and the guides supporting the blade on both of its sides.

Finally it will be understood that it would be possible to use before known swaging parts in this machine too, but this would not remove the need for separate shaping operation.

Having now described the nature of my invention I declare that what I claim is:

1. Apparatus for swaging the tooth of a saw blade comprising means for chucking the saw blade, an anvil for supporting the tooth during the swaging, said anvil comprising a tooth back supporting surface and tooth side guiding surfaces depending therefrom, a rotatable shaft extending transversely of the position in which the saw blade is chucked and adjacent said anvil, and a tool for swaging the cutting edge of the tooth mounted on said shaft, said tool having a plurality of swaging points thereon positioned at different radial distances from the axis of rotation of the shaft, and said shaft having the tooth side supporting surfaces thereon, the space defined between said tooth back supporting surface and said tooth side supporting surfaces and said tool having the form and shape of the finished tooth, whereby when the shaft is rotated the said plurality of points are brought to bear on the cutting edge of the tooth successively.

2. Apparatus as claimed in claim 1 in which at least one of the working points of said tool protrudes out of the peripheral surface of said tool, said point having a dimension in the direction parallel to the axis of rotation of the tool which is less than the width of the cutting edge of the tooth.

3. Apparatus as claimed in claim 1 in which said side supporting surfaces taper inwardly toward said back supporting surface.

4. Apparatus for swaging the tooth of a saw blade comprising means for chucking the saw blade, an anvil for supporting the tooth during the swaging, said anvil comprising a tooth back supporting surface and tooth side guiding surfaces depending therefrom, a rotatable shaft extending transversely of the position in which the saw blade is chucked and adjacent said anvil, and a tool for swaging the cutting edge of the tooth mounted on said shaft, said tool having a plurality of swaging points thereon positioned at different radial distances from the axis of rotation of the shaft, and said shaft having the tooth side supporting surfaces thereon, the space defined between said tooth back supporting surface and said tooth side supporting surfaces and said tool having the form and shape of the finished tooth, a wheel on the end of said rotatable shaft, an arm having one end eccentrically connected to said wheel, a two armed driving crank, the other end of said arm being slidably connected to the end of one arm of said crank, a roller on the other arm of said crank, a cam plate having a cam slot therein in which said roller rolls, said cam plate being pivoted at one end on said apparatus, one end of a plurality of connecting rods being slidably and pivotally connected to the other end of said cam plate, a blade carriage slidably mounted on said apparatus and to which the other ends of said connecting rods are pivoted, a link pivotally connected to the sliding pivotal connection of said connecting rods and said cam plate, said link having the other end resiliently pivoted on said carriage, and clamping means pivoted on said apparatus and actuated by said carriage for tightly clamping a saw blade during movement of said carriage.

References Cited in the file of this patent

UNITED STATES PATENTS

| | | |
|---|---|---|
| 315,104 | Wolfe | Apr. 7, 1885 |
| 493,435 | Lockwood | Mar. 14, 1893 |
| 499,295 | Kirkpatrick | June 13, 1893 |
| 940,024 | Jackson | Nov. 16, 1909 |
| 1,084,602 | Bowman | Jan. 20, 1914 |
| 1,173,509 | Hedstrom | Feb. 29, 1916 |
| 1,176,985 | Pribnow | Mar. 28, 1916 |
| 1,492,093 | Bernhart | Apr. 29, 1924 |
| 1,557,090 | Ricker | Oct. 13, 1925 |
| 1,943,863 | Gommel | Jan. 16, 1934 |
| 2,800,039 | Vollmer | July 23, 1957 |

FOREIGN PATENTS

| | | |
|---|---|---|
| 570,058 | Great Britain | June 20, 1945 |
| 750,401 | France | Aug. 10, 1933 |